United States Patent [19]

Reece

[11] 4,418,356

[45] Nov. 29, 1983

[54] INK JET PRINT HEAD

[75] Inventor: John W. Reece, Ithaca, N.Y.

[73] Assignee: NCR Corporation, Dayton, Ohio

[21] Appl. No.: 305,052

[22] Filed: Sep. 23, 1981

[51] Int. Cl.[3] ............................................. G01D 15/18
[52] U.S. Cl. ................................................. 346/140 R
[58] Field of Search ................................. 346/140 PD

[56] References Cited

U.S. PATENT DOCUMENTS

| | | | |
|---|---|---|---|
| 4,231,048 | 10/1980 | Horike et al. | 346/140 PD |
| 4,308,546 | 12/1981 | Halasz | 346/140 PD |
| 4,346,393 | 8/1982 | Wallace et al. | 346/140 PD |
| 4,367,480 | 1/1983 | Kotoh | 346/140 PD |

FOREIGN PATENT DOCUMENTS

| | | | |
|---|---|---|---|
| 55-142668 | 11/1980 | Japan | 346/140 PD |

*Primary Examiner*—George H. Miller, Jr.
*Attorney, Agent, or Firm*—J. T. Cavender; Wilbert Hawk, Jr.; George J. Muckenthaler

[57] ABSTRACT

A cluster or array of ink jet printing elements consisting of two or more inclined rows of tubular transducers are folded or indexed in an interleaf pattern to maintain the nozzles of the transducers in parallel manner for use in a compact print head.

7 Claims, 14 Drawing Figures

FIG. 10
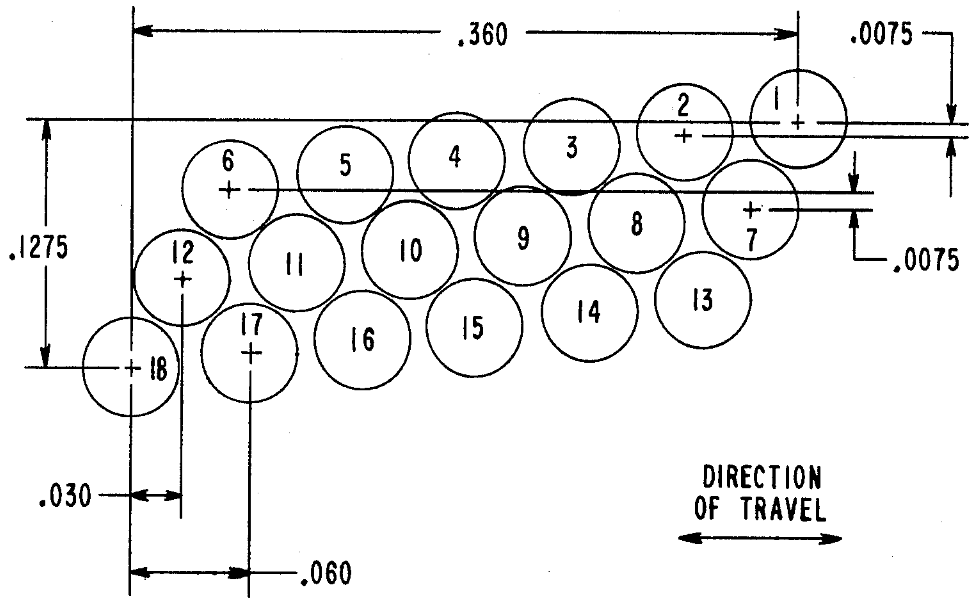
FIG. 11A
FIG. 11B
FIG. 11C
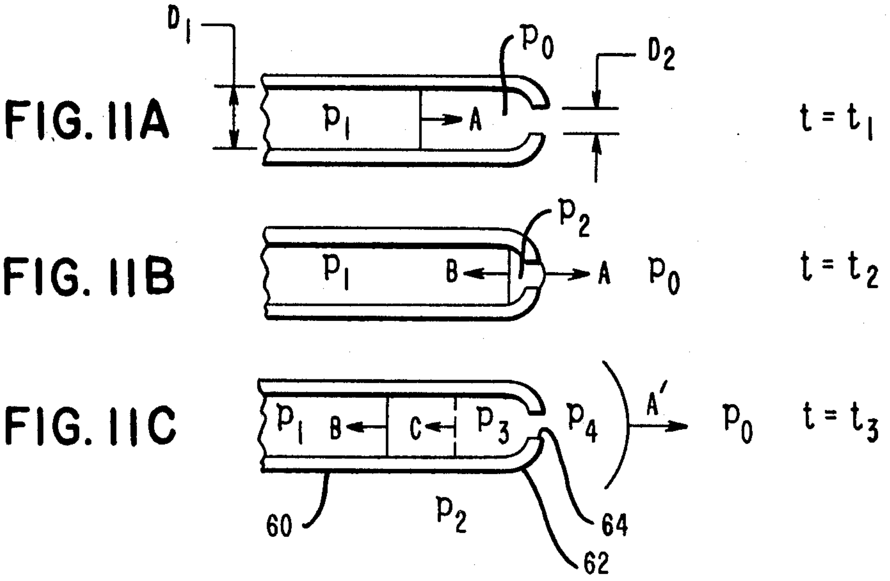

INK JET PRINT HEAD

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is wellknown, the impact operation depends upon the movement of impact members such as wires or the like and which are typically moved by means of an electromechanical system which is believed to enable a more precise control of the impact members.

The advent of non-impact printing as in the case of thermal printing, brought out the fact that the heating cycle must be controlled in a manner to obtain maximum repeated operations. Likewise, the control of ink jet printing in at least one form thereof must deal with rapid starting and stopping movement of the ink fluid from a supply of the fluid. In each case, the precise control of the thermal elements and of the ink droplets is necessary to provide for both correct and high-speed printing.

In the matter of ink jet printing, it is extremely important that the control of the ink droplets be precise and accurate from the time of formation of the droplets to depositing of such droplets on paper or like record media and to make certain that a clean printed character results from the ink droplets. While the method of printing with ink droplets may be performed either in a continuous manner or in a demand pulse manner, the latter type method and operation is disclosed and is preferred in the present application as applying the features of the present invention. The drive means for the ink droplets is generally in the form of a piezoelectric crystal element to provide the high-speed operation for ejecting the ink through the nozzle while allowing time between droplets for proper operation. The ink nozzle construction must be of a nature to permit fast and clean ejection of ink droplets from the print head.

In the ink jet printer, the print head structure may be a multiple nozzle type with the nozzles aligned in a vertical line and supported on a print head carriage which is caused to be moved or driven in a horizontal direction for printing in line manner. The ink droplet drive elements or transducers may be positioned in a circular configuration with passageways leading to the nozzles. Alternatively, the printer structure may include a plurality of equally spaced horizontally alinged single nozzle print heads which are caused to be moved in back and forth manner to print successive lines of dots making up the lines of characters. In this latter arrangement, the drive elements or transducers are individually supported along a line of printing.

Since it is desirable to eliminate a curving transition section between the drive elements and the nozzles as in the case of the circular arrangement, it is proposed to provide an array of ink jet transducers in parallel manner for use in a compact print head.

Representative prior art in the field of ink jet print heads includes U.S. Pat. No. 3,373,437 issued to R. G. Sweet et al. on Mar. 12, 1968, which discloses a fluid droplet recorder with a plurality of jets and wherein a common fluid system supplies ink to an array of side-by-side nozzles.

U.S. Pat. No. 3,683,212 issued to Steven I. Zoltan on Aug. 8, 1972, discloses an electroacoustic transducer coupled to liquid in a conduit which terminates in a small orifice through which droplets of ink are ejected.

U.S. Pat. No. 4,005,440 issued to J. R. Amberntsson et al. on Jan. 25, 1977, discloses a printing head of smaller size and wherein the openings of the capillary tubes are located closer to one another.

U.S. Pat. No. 4,014,029 issued to R. Lane et al. on Mar. 22, 1977, discloses a nozzle plate having at least two rows of nozzles and effecting a staggered nozzle array wherein the nozzles in one row are laterally displaced with respect to the nozzles in another row to print a portion of a line at a time, a line at a time or several lines at a time.

U.S. Pat. No. 4,128,345 issued to J. F. Brady on Dec. 5, 1978, discloses a fluid impulse matrix printer having a two-dimensional array of tubes in a $5 \times 7$ matrix to print a complete character at a time.

U.S. Pat. No. 4,158,847 issued to J. Heinzl et al. on June 19, 1979, discloses a piezoelectric operated print head having twin columns of six nozzles.

U.S. Pat. No. 4,189,734 issued to E. L. Kyser et al. on Feb. 19, 1980, discloses a writing fluid source feeding drop projection means which ejects a series of droplets through a column of seven nozzles with sufficient velocity to traverse a substantially straight trajectory to the record medium.

SUMMARY OF THE INVENTION

The present invention relates to ink jet printers and more particularly to an array of ink droplet drive elements or transducers. Each of such drive elements includes a glass tube with a nozzle formed at one end thereof and a piezoelectric crystal positioned on the exterior of the glass tube for initiating the formation of ink droplets by pulsing the ink supply inside the tube and causing ink to be ejected from the nozzle in droplet form.

The nozzle array is formed in a pattern to generate equally separated parallel rows of dots on the record media or paper. The print head consists of a cluster of tubular transducers or ink droplet drive elements wherein each drive element has a piezoelectric actuating means and a coaxial nozzle. In a preferred arrangement, the particular nozzle array consists of two or more inclined rows of printing elements which are preferably parallel so as to minimize the effect of the gap between the nozzles and the record media with regard to the dot positions. It is also within the scope of the invention to provide a single inclined row of printing elements if spacing permits such an arrangement.

In view of the above discussion, the principal object of the present invention is to provide an ink jet print head for generating equally spaced parallel rows of dots on record media.

Another object of the present invention is to provide a plurality of ink droplet drive elements formed in a parallel cluster print head configuration.

An additional object of the present invention is to provide a print head having a cluster of ink droplet actuating members positioned in coaxial manner.

A further object of the present invention is to provide a print head having a compact array of ink droplet drive elements and associated ink nozzles arranged in two or more inclined rows to enable a line of printing.

Additional advantages and features of the present invention will become apparent and fully understood from a reading of the following description taken together with the annexed drawing.

BRIEF DESCRIPTION OF THE DRAWING

FIG. 10 is an end view of a cluster of transducers in three inclined rows;

FIGS. 11A, 11B and 11C show a variation of the inlet end of the transducer ink chamber.

DESCRIPTION OF THE PREFERRED EMBODIMENT

Figure 1:
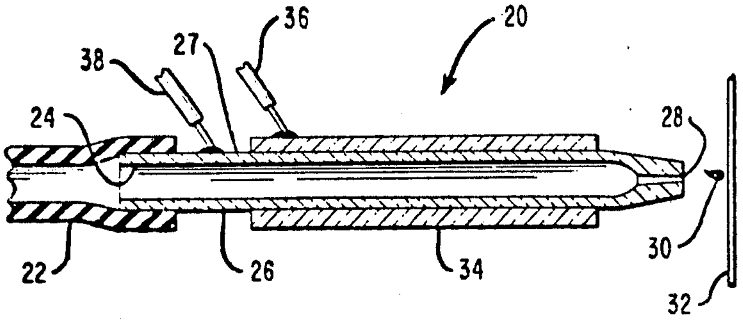
FIG. 1 is a sectional view of an existing type transducer element used in the present invention.

Referring now to the drawing, FIG. 1 illustrates a transducer element of the pulse-on-demand type as disclosed in Zoltan U.S. Pat. No. 3,683,212 as mentioned above. The single transducer permits a relatively fast loading or filling with ink, it permits reliably purging of any air bubbles in the ink and it shows good performance of 2,000 drops or more per second in operating rates. However, since single drop-on-demand transducers have limited performance potential and application, it has been the practice to collect the transducers and nozzles into a cluster or arrangement as disclosed in Heinzl et al. U.S. Pat. No. 4,158,847 and Kyser et al. U.S. Pat. No. 4,189,734 as also mentioned above. It is readily seen that in these patents a curving transition section is provided between the piezoelectric driver section and the nozzles of the print head.

The transducer element 20 of FIG. 1 includes an inlet tube 22 fitted over one end 24 of a glass tube 26 which is reduced or necked down at the other end to form a nozzle 28 for ejection of droplets 30 of ink onto record media 32 which is normally spaced a relatively small distance from the nozzle. The glass tube 26 serves as an elongated ink chamber around which is provided a piezoelectric crystal sleeve 34 which has an electrical lead 36 connected thereto. An electrical lead 38 is connected to a tinned region 27 of the glass tube 26 so as to provide electrical contact to the inner wall of the piezoelectric sleeve 34. When the piezoelectric crystal 34 is electrically pulsed, a droplet 30 of ink is injected from the nozzle 28 by reason of the sudden constriction of the crystal 34 and the compression of the walls of the tubing 26. The inlet tube 22 carries ink from a supply (not shown) and the tube 22 is made of a pliable grade of elastomer such as silicone rubber to provide for absorption of upstream propagating pressure pulses and to prevent these pulses from interfering with the ink drop generation process.

By reason of the small diameter of the tubular type pulse-on-demand transducer, it is possible to cluster a number of these transducers in an arrangement or pattern so as to form a matrix print head in a compact area. Since the dot spacing in matrix printing is normally about 0.015 inch vertically and since the small diameter of 0.050 inch for the individual transducer allows for such compact construction, a grid or matrix of one dot per 0.015 inch vertical spacing and two dots per 0.030 inch horizontal spacing provides for small clustered units, as exemplified by the folded pattern shown in FIG. 2. It is seen that for a seven nozzle print head the grid is made up of three transducers being indexed to the right so as to interleaf with the upper four transducers. In an arrangement wherein the seven transducers are in a single row, as in an echelon formation, such arrangement is appropriate for printing an $N \times 7$ character matrix having a cell size of $0.015 \times 0.015$ inch. It is sufficient to point out that the transducers in the cluster of FIG. 2 are separated by typical dimensions as shown for both horizontal and vertical directions in a regular modulus relative to the matrix cell dimension.

Figure 2:
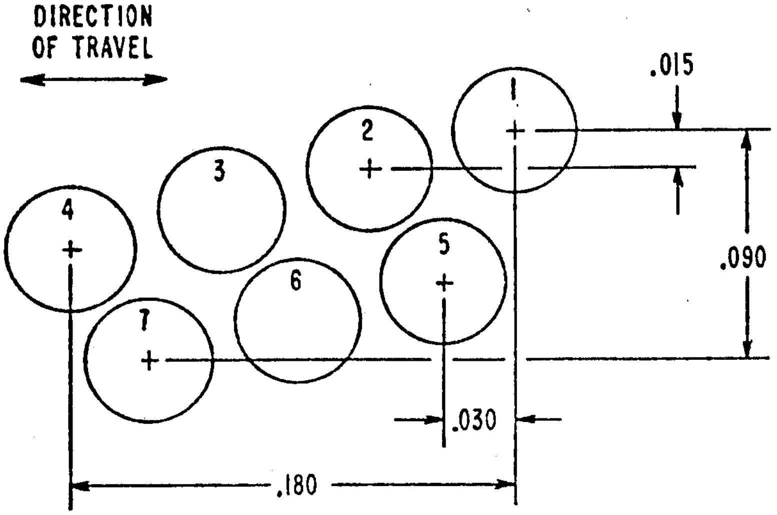
FIG. 2 is a view of a cluster of transducers of FIG. 1 in two inclined rows thereof.
Figure 3:
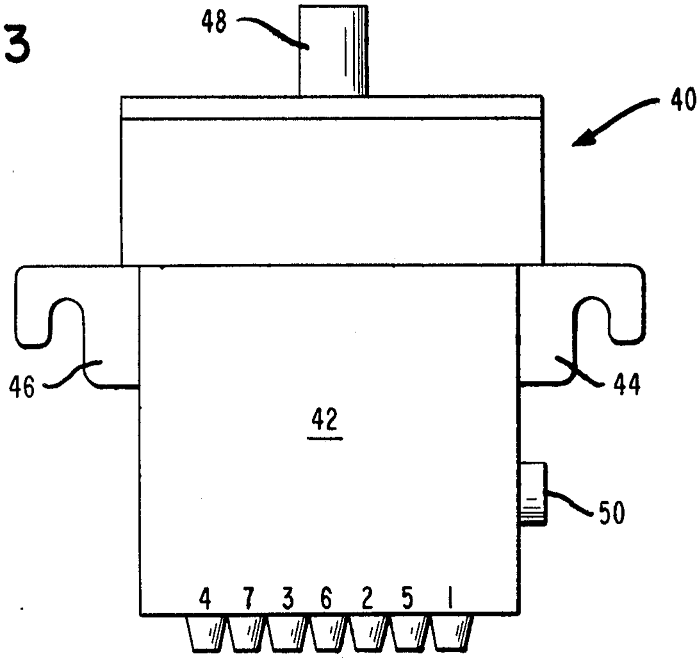
FIG. 3 in a front view of a print head for housing a cluster of transducers.
Figure 4:
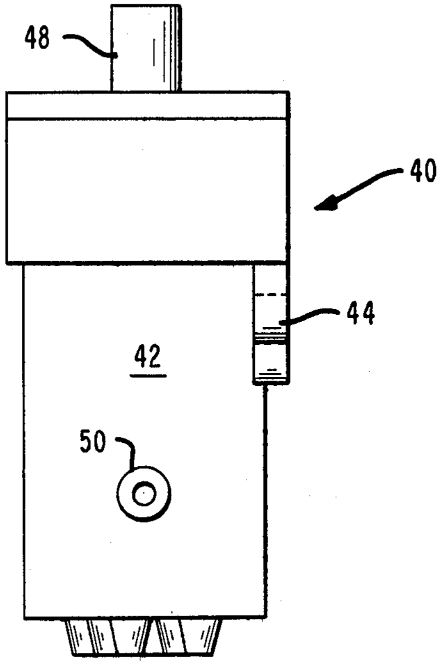
FIG. 4 is a right side view of the print head of FIG. 3.

Since it is necessary for full width printing that all printing elements have a requirement to sweep or be moved past the first column of dots in a line and the last column of dots, it can be seen that the folded cluster of printing elements, as seen in FIG. 2, reduces the required stroke, thereby reducing the cycle time of operation, increases printer thruput capability and subtracts directly from the printer width requirement. In the seven nozzle folded pattern, the required overtravel for a full width print line is 0.180 inch. The technology for providing firing pulses coordinated with carriage or print head motion and for selecting electrical channels to be actuated in accordance with data flow for printing with such folded cluster of printing elements is presently within the realm of conventional or well-known logic.

Figure 7:
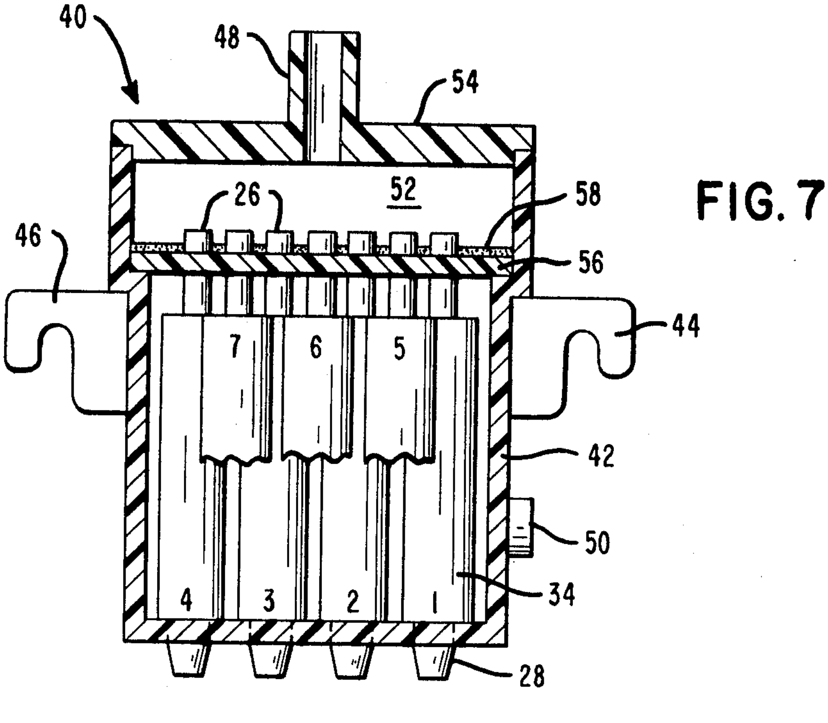
FIG. 7 is a sectional view taken along the plane 7—7 of FIG. 5.

FIGS. 3, 4, 5, 6 and 7 show a print head 40 wherein the seven transducers 20 of FIG. 1 are packaged in a housing 42 having mounting lugs 44 and 46. An inlet connection 48 for the ink and a connection or port 50 for electrical leads are provided at the top and the right side, respectively, of the housing 42. A chamber 52 in FIG. 7 is formed as an ink plenum in the upper portion of the housing 42 and a cover 54 fits over the walls of the chamber. The transducers 20 are positioned within the housing 42 of the print head 40 with the ends of the glass tubes 26 extending through a bulkhead 56 and into the chamber 52. A cement-type sealant 58 is applied in a thin layer on the bulkhead 56 and around the glass ends of the tubes 26 to provide a tight enclosure and to hermetically bond the bulkhead 56 to the housing 42 and the glass tubes 26 to the bulkhead 56.

Figure 5:
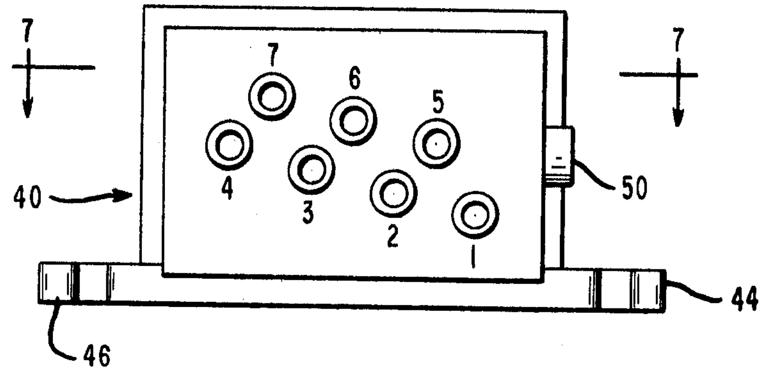
FIG. 5 is a bottom view of the print head of FIG. 3.
Figure 6:
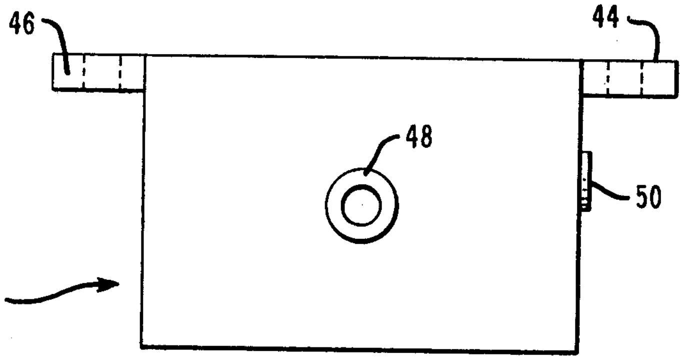
FIG. 6 is a top view of the print head of FIG. 3.

In the assembly of the print head 40, the transducers 20 are placed into the plastic housing 42 with the nozzle ends of the transducers extending through holes in the bottom wall of the housing corresponding to the slanted or inclined row pattern as seen in FIG. 5. The bulkhead 56 which has a matching hole pattern is set in place over the inlet ends of the glass tubes 26 and onto the shoulder provided in the wall of the housing to maintain the transducers in correct registration. The sealant 58 is then applied and the cover 54 is attached by bonding to the housing 42. The electrical leads 36 and 38 from each transducer 20 are brought out through the connection or port 50.

Figure 8:
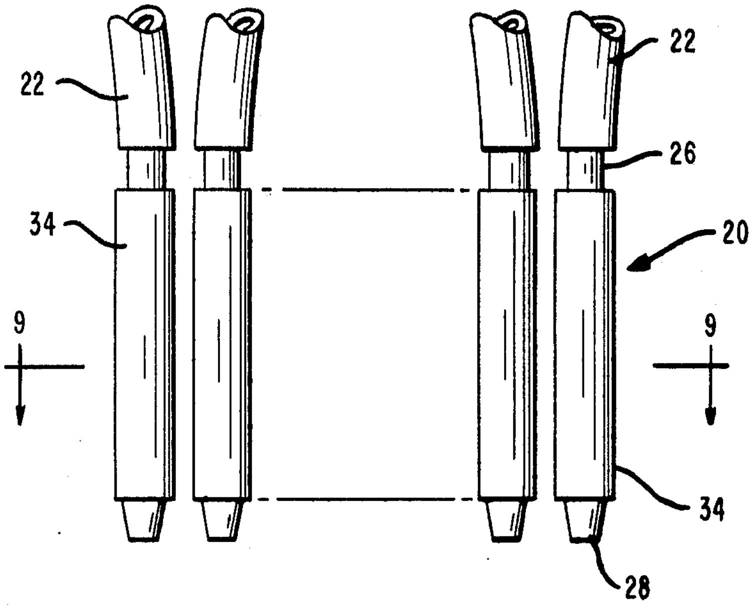
FIG. 8 is a side view of a cluster of transducers in one inclined row.
Figure 9:
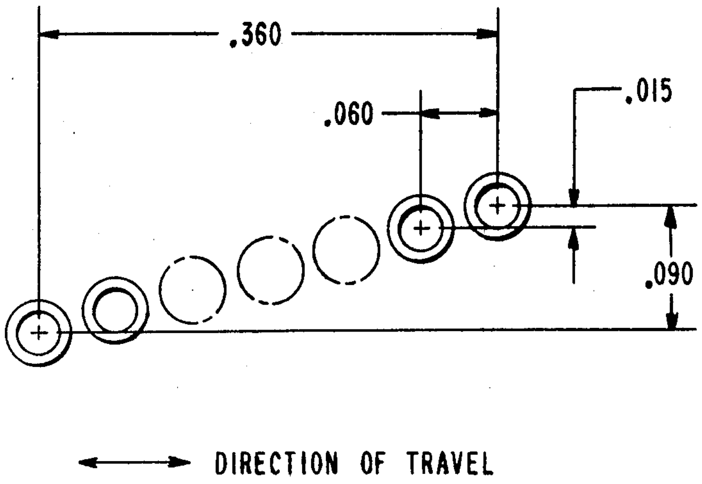
FIG. 9 is an end view of the cluster of transducers of FIG. 8 in one inclined row.

FIG. 8 shows the seven transducer echelon cluster as briefly mentioned above which is appropriate for printing the $N \times 7$ character matrix and arranged in a single inclined row as seen in the projection view of FIG. 9. These transducers are made up of the inlet tube 22, the glass tube 26, the nozzle 28 and the piezoelectric crystal 34, and are spaced at typical dimensions as shown.

A modified array or pattern is shown in FIG. 10 wherein eighteen transducers are arranged in three inclined rows for use in higher resolution printing, and are spaced at typical dimensions. When the triple arrangement of FIG. 10 is compared with the single row of FIG. 9, it is seen that the overall width of the pattern is 0.360 inch for both the single and the triple pattern in a typical spacing of 0.060 inch between transducers in the same row. In the double row of FIG. 2 and the triple row pattern of FIG. 10, a typical spacing of 0.030 inch between adjacent transducers in adjacent rows or 0.060 inch between adjacent transducers in the same row provides an overall width of 0.180 inch between the centers of right and left transducers in the double row pattern and an overall width of 0.360 inch between centers of right and left transducers in the triple row pattern.

FIGS. 11A, 11B and 11C show a portion of a glass tube 60 which is provided with an inlet end 62 in a necked down configuration or reduced diameter aperture 64 for the purpose of reducing wave reflection during operation. The abrupt electrical pulsing of the piezoelectric crystal element 34 of the transducer 20 and the sudden reduction in volume within the ink chamber result in a system of elastic waves being generated in the fluid ink. This wave system not only causes a droplet of ink 30 to be expressed from the nozzle 28 (to the left in the view shown in FIG. 11) but members of the system also cause undesired disturbances to be propagated upstream against the supply of ink.

One such of the elastic waves to be considered is the leading upstream propagating wave A in the plane near the end of the tube as seen in FIG. 11A. When such wave A reaches the open end of the tube, the wave is reflected in opposite sign, that is a compression wave is reflected as an expansion wave of equal strength and an expansion wave is reflected as a compression wave of equal strength. If the wave is incident on the closed end of a tube, the wave reflects in kind and it is readily seen that the reflected wave could disrupt the ink droplet generation process.

Some alleviation or comforting of this condition can be gained or obtained by necking down or reducing the diameter of the inlet port or aperture 62 of the glass tube 60. The incident wave A is shown approaching the inlet port or aperture 64 at the time $t=t_1$. The incident wave A leaves the glass tube 60 at time $t=t_2$ at which time a reduced strength wave B is reflected by the change in cross-sectional area of the ink channel or chamber of the transducer and then starts to propagate downstream toward the nozzle or to the left in FIG. 11B.

As the original wave A passes or travels out of the tube 60 into a virtual open space or volume, the wave rapidly is weakened in that the initial pressure change, as rise or fall across the wave, abruptly reduces to a much smaller level. An adjustment in equilibrium for this reduction in pressure must be made in the channel of the tube 60 wherein the adjustment takes the form of a pressure wave C of the same family of waves as the wave B but opposite in strength or amplitude. It is thus seen that if the diameter ratio of $D_2$ to $D_1$ is suitably determined and adjusted for the pressures utilized in the operation, the waves B and C will be equal and opposite in strength or value. By reason that the waves B and C are separated slightly in matter of time and space, such waves cannot merge with and cancel each other so that the result is a doublet or double wave across which a pressure change $P_3-P_1$ will be small and ideally zero compared to the original pressure change.

Figure 12:
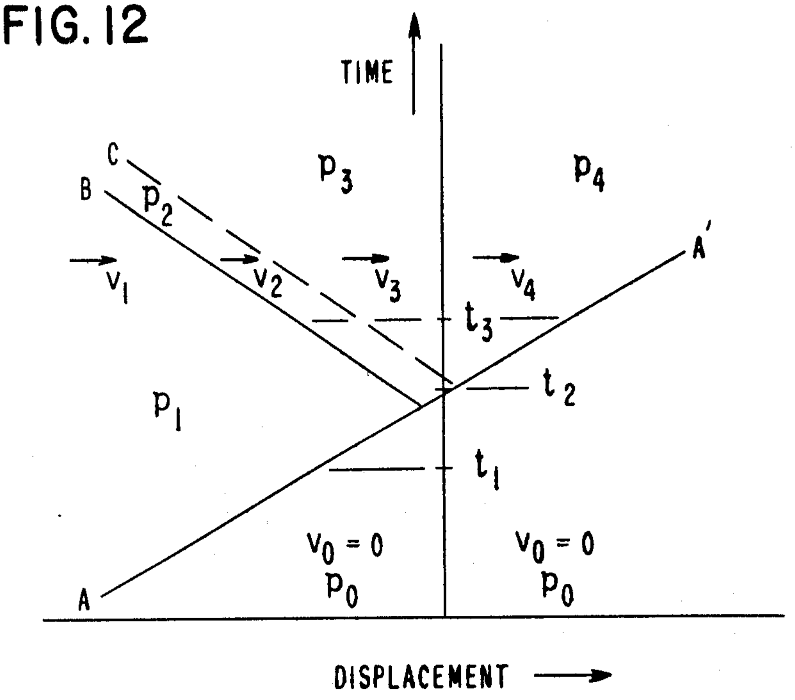
FIG. 12 is a time-displacement wave diagram of the phenomena of FIG. 11.

FIG. 12 is a plot of wave front displacement vs. time which is commonly called a wave diagram and shows the above-described phenomena or operating conditions in summary form.

In proceeding with an analysis of the wave reflection problem, it is assumed that the waves are plane waves, that the fluid is compressible and inviscid or non-sticky that the fluid flow is described as being one-dimensional. Wave strength may be characterized by either the pressure change or the velocity change occurring across the wave and these relationships for waves A, B and C, are respectively:

$$P_1-P_0=dc(V_1-V_0) \qquad \text{Equation 1}$$

$$P_2-P_1=-dc(V_2-V_1) \qquad \text{Equation 2}$$

$$P_3-P_2=-dc(V_3-V_2) \qquad \text{Equation 3}$$

wherein p=pressure

V=fluid velocity d=density c=speed of sound in the fluid.

and the subscripts denote the corresponding region or area of the ink chamber within the transducer.

In the manner of the aperture 64 at the inlet end 62 of the glass tube 60 acting as a throat, the steady flow conditions apply between and within regions 3 and 4 after the time $t_2$. Using a superscript asterisk to denote these throat conditions, the following momentum and continuity equations may be applied.

$$P_3-P^*=\tfrac{1}{2}d(V^{*2}-V_3^2) \qquad \text{Equation 4}$$

$$dV^*D_2^2=dV_3D_1^2 \qquad \text{Equation 5}$$

Equations 4 and 5 can be combined to provide Equation 6.

$$P_3-P^*=\tfrac{1}{2}\,d\,V_3^2\left[\left(\frac{D_1}{D_2}\right)^4-1\right] \qquad \text{Equation 6}$$

The pressure at the throat P* is the same static pressure as in the region 4.

$$P^*=P_4 \qquad \text{Equation 7}$$

Since the emitted wave A' is relatively weak, $$P_4=P_0\text{(approximately)} \qquad \text{Equation 8}$$

so that Equation 6 may be replaced by $$P_3-P_0=\tfrac{1}{2}\,d\,V_3^2\left[\left(\frac{D_1}{D_2}\right)^4-1\right] \qquad \text{Equation 9}$$

A second relation between $P_3$ and $V_3$ may be obtained from Equations 1, 2 and 3. Noting that $V_0=0$, $$P_3 - P_1 = -dc(V_3 - V_1) \quad \text{Equation 10}$$

But the condition to be imposed to insure no net change across the dobulet is $$P_3 = P_1 \text{ (by imposition)} \quad \text{Equation 11}$$

therefore, $$V_3 = V_1 \quad \text{Equation 12}$$

Now making these substitutions in Equation 9 and using Equation 1 to substitute for $V_1$ in terms of $P_1 - P_0$, Equation 9 becomes $$P_1 - P_0 = \frac{(P_1 - P_0)^2}{d^2c^2}\left[\left(\frac{D_1}{D_2}\right)^4 - 1\right] \quad \text{Equation 13}$$

This result yields for the required diameter ratio, $$\frac{D_1}{D_2} = \left[1 + \frac{2dc^2}{P_1 - P_0}\right]^{\frac{1}{4}} \quad \text{Equation 14}$$

In a typical case for water/glycol based ink, $d = 1100\ kg/m^2$ $c = 1500\ m/s$ $P_1 - P_0 = 100{,}000$ pa $D_1/D_2 = 14.9$.

It is thus seen that herein shown and described is an ink jet print head wherein individual transducers are placed in a parallel configuration and in a folded pattern of inclined rows to provide a compact unit. The arrangement enables the accomplishment of the objects and advantages mentioned above, and while a preferred embodiment and a modification thereto have been disclosed herein, other variations may occur to those skilled in the art. It is contemplated that all such variations and modifications not departing from the spirit and scope of the invention hereof are to be construed in accordance with the following claims.

I claim:

1. An ink jet print head comprising a
housing,
means supplying ink into said housing, a
chamber within the housing for receiving ink, and a
plurality of electrically pulsed ink droplet drive elements positioned to receive ink from the chamber and disposed in substantially parallel manner and arranged in inclined rows within the housing, the drive elements having nozzles mutually parallel and operable to cause ink to be ejected in parallel manner from the housing in droplet form.

2. The print head of claim 1 wherein the drive elements include tubular members having a reduced portion at one end thereof to provide a nozzle for ejection of ink droplets.

3. The print head of claim 1 wherein said drive elements comprise tubular elements arranged in two inclined rows to effect the printing of dot matrix characters.

4. The print head of claim 1 wherein said drive elements include tubular elements arranged in three inclined rows to effect the printing of high resolution dot matrix characters.

5. A compact print head for demand printing of droplets of ink comprising a
housing,
means supplying ink into said housing, a chamber within the housing for receiving ink, and a
plurality of electrically pulsable transducer elements positioned in substantially parallel fashion and placed in slanted rows within the housing, the transducer elements being connected with the chamber for receiving ink therefrom and having nozzles mutually parallel and operable to cause the droplets of ink to be ejected in parallel manner onto record media in dot matrix manner.

6. The print head of claim 5 wherein said transducer elements comprise tubular members having a reduced diameter at one end thereof to provide an orifice for ejection of the droplets of ink.

7. The print head of claim 5 wherein said transducer elements are tubular elements arranged in two slanted rows to effect the printing of dot matrix characters.

* * * * *